United States Patent [19]
Michaud

[11] Patent Number: 5,255,032
[45] Date of Patent: Oct. 19, 1993

[54] COMPACT CAMERA WITH DEPLOYABLE FLASH UNIT

[75] Inventor: Patricia F. Michaud, Winsted, Conn.

[73] Assignee: Eastman Kodak Company, Rochester, N.Y.

[21] Appl. No.: 917,651

[22] Filed: Jul. 23, 1992

[51] Int. Cl.⁵ .................. G03B 15/03; G03B 17/02
[52] U.S. Cl. .................. 354/149.11; 354/126; 354/288
[58] Field of Search ............ 354/149.1, 126, 288, 354/187, 149.11

[56] References Cited

U.S. PATENT DOCUMENTS

| | | | |
|---|---|---|---|
| 3,650,188 | 3/1972 | Whall | 354/288 |
| 3,852,790 | 12/1974 | Robison | 354/126 X |
| 3,882,514 | 5/1975 | Graham | 354/149.1 |
| 4,106,037 | 8/1978 | Nakamura et al. | 354/288 X |
| 4,106,077 | 8/1978 | Furda | 354/126 X |
| 4,350,420 | 9/1982 | Engelsmann et al. | 354/126 X |
| 4,847,647 | 7/1989 | Ueda | 354/149.1 |
| 4,893,139 | 1/1990 | Alligood et al. | 354/149.1 |
| 4,920,368 | 4/1990 | Arai et al. | 354/145.1 |
| 4,983,999 | 1/1991 | Melsezahl et al. | 354/149.11 |
| 5,023,639 | 6/1991 | Ushiro et al. | 354/149.11 X |

Primary Examiner—Michael L. Gellner
Assistant Examiner—Jae N. Noh
Attorney, Agent, or Firm—Roger A. Fields

[57] ABSTRACT

In a compact camera, a deployable flash unit is supported at its opposite sides by a pair of pivotable slidable legs that collapse against the camera body when the flash unit is retracted to a storage position.

5 Claims, 3 Drawing Sheets

COMPACT CAMERA WITH DEPLOYABLE FLASH UNIT

CROSS-REFERENCE TO A RELATED APPLICATION

Reference is made to commonly assigned copending application Ser. No. 078/917,856, entitled COMPACT CAMERA WITH DEPLOYABLE FLASH UNIT, and filed Jul. 28, 1992 in the name of Debby Hyunjin Kwak.

BACKGROUND OF THE INVENTION

1. Field of the Invention

The invention relates generally to the field of photography, and in particular to photographic cameras. More specifically, the invention relates to a compact camera with a deployable or extendable flash unit.

2. Description of the Art

Nowadays it is an important objective in designing cameras to provide one that is relatively compact. Toward this end there has been designed various cameras with collapsible or foldable electronic flash units. For example, U.S. Pat. No. 4,920,368, issued Apr. 24, 1990, and U.S. Pat. No. 4,910,542, issued Mar. 20, 1990, each disclose a single-lens reflex camera having an electronic flash unit that is supported by a linkage mechanism for movement between a storage or non-firing position enclosed in the camera body and an operative or firing position extended substantially from the camera body. In the storage position, the flash unit is integrated with the camera body. In the operative position, the flash unit is further spaced from the camera's taking lens to substantially reduce the known red-eye affect that may occur during exposure.

Problem to be Solved by the Invention

To-date, many camera designs continue to leave room for improvement with respect to compactness. For example, in order to enclose the flash unit in the camera body when the flash unit is in its storage position as disclosed in prior art U.S. Pats. Nos. 4,920,368 and 4,910,542, the volume of the camera body must be made larger. This controverts the objective to make the camera body compact.

The Cross-referenced Application

The cross-referenced application discloses a compact camera including a flash unit and a viewfinder airspace. The flash unit and viewfinder airspace are relatively sized to fit the flash unit into the viewfinder airspace for storage purposes.

SUMMARY OF THE INVENTION

According to the invention, a compact camera comprising a camera body, a flash unit, and means supporting the flash unit for movement relative to the camera body between a storage position and an operative position, is characterized in that:

said supporting means includes a pair of flash support legs configured to be able to cover respective, spaced, top face portions of the camera body separated from each other by a gap adapted to receive the flash unit and means connecting the legs to the flash unit and to the camera body for retracting the flash unit into the gap and collapsing the legs substantially flat against the top face portions of the camera body when the flash unit is moved to its storage position and for projecting the flash unit from the gap and raising the legs from the top face portions when the flash unit is in its operative position.

This arrangement has been found to provide a camera design with improved compactness as compared to known prior art cameras.

DETAILED DESCRIPTION OF THE PREFERRED EMBODIMENT

The invention is disclosed as being embodied preferably in a compact 35 mm still camera. Because the features of this type of camera are well known, the description which follows is directed in particular to those elements forming part of or cooperating directly with the preferred embodiment. It is to be understood, however, that other elements not shown or described may take various forms known to persons of ordinary skill in the art.

Figure 1:
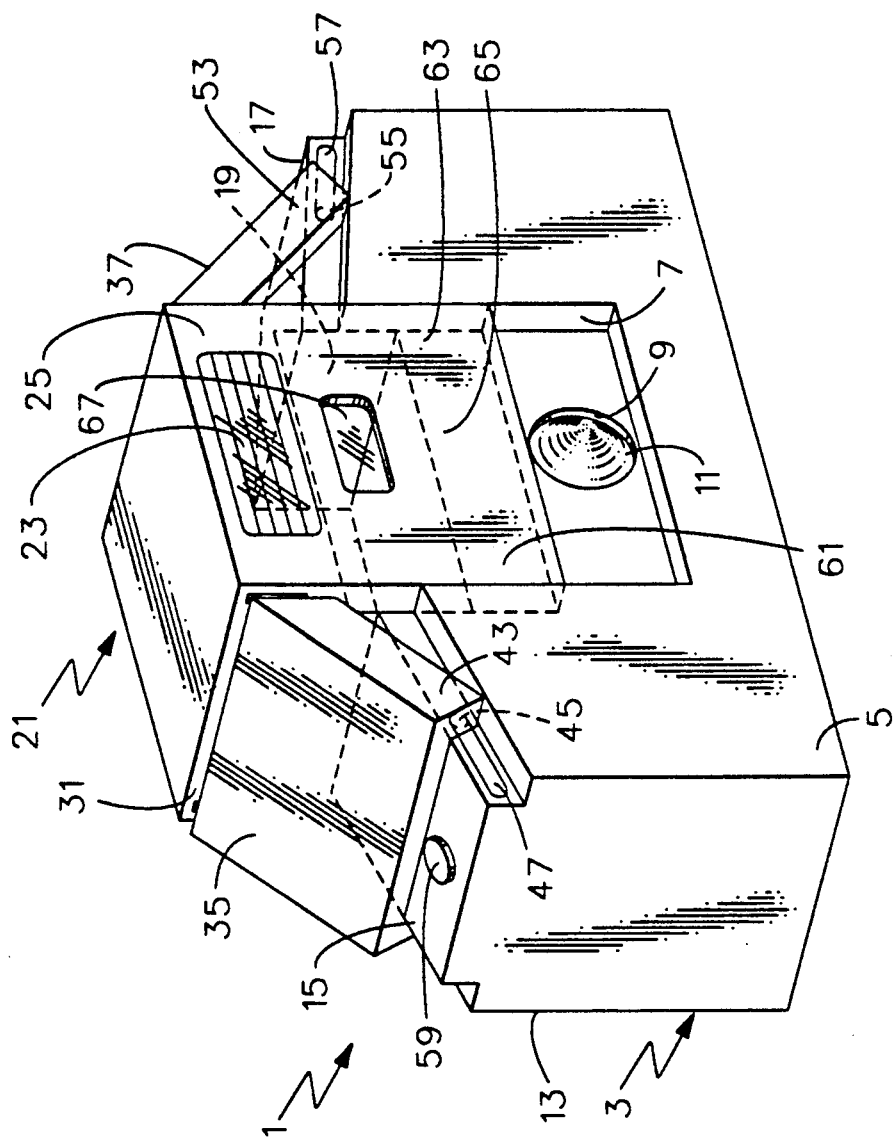
FIG. 1 is a front perspective view of a compact camera with a deployable flash unit according to a preferred embodiment of the invention, showing the flash unit deployed in an operative or firing position.
Figure 2:
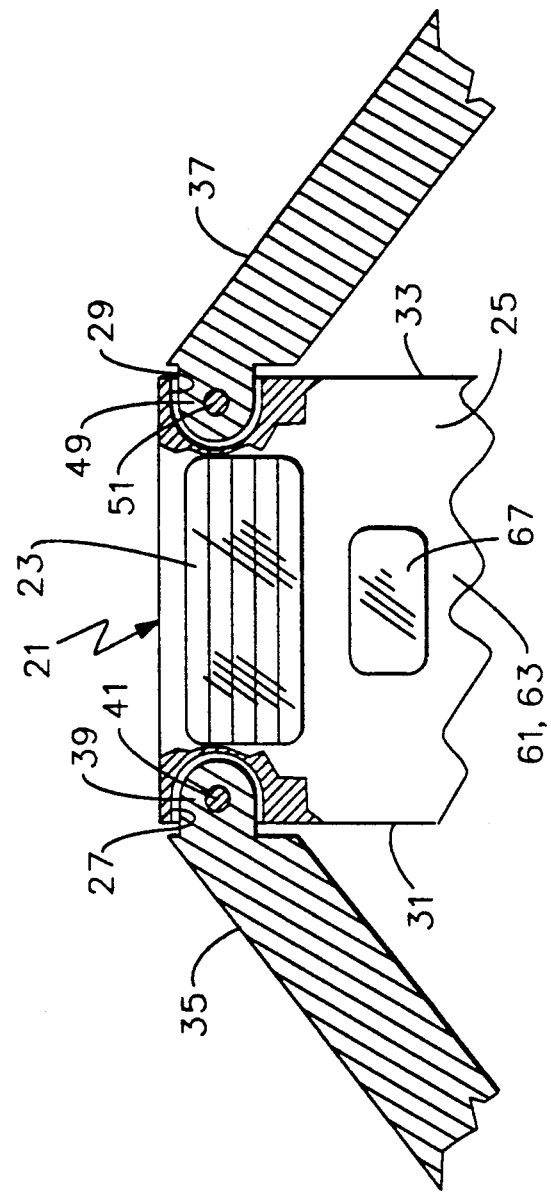
FIG. 2 is a front elevation view partly in section of the flash unit and a pair of flash support legs.
Figure 3:
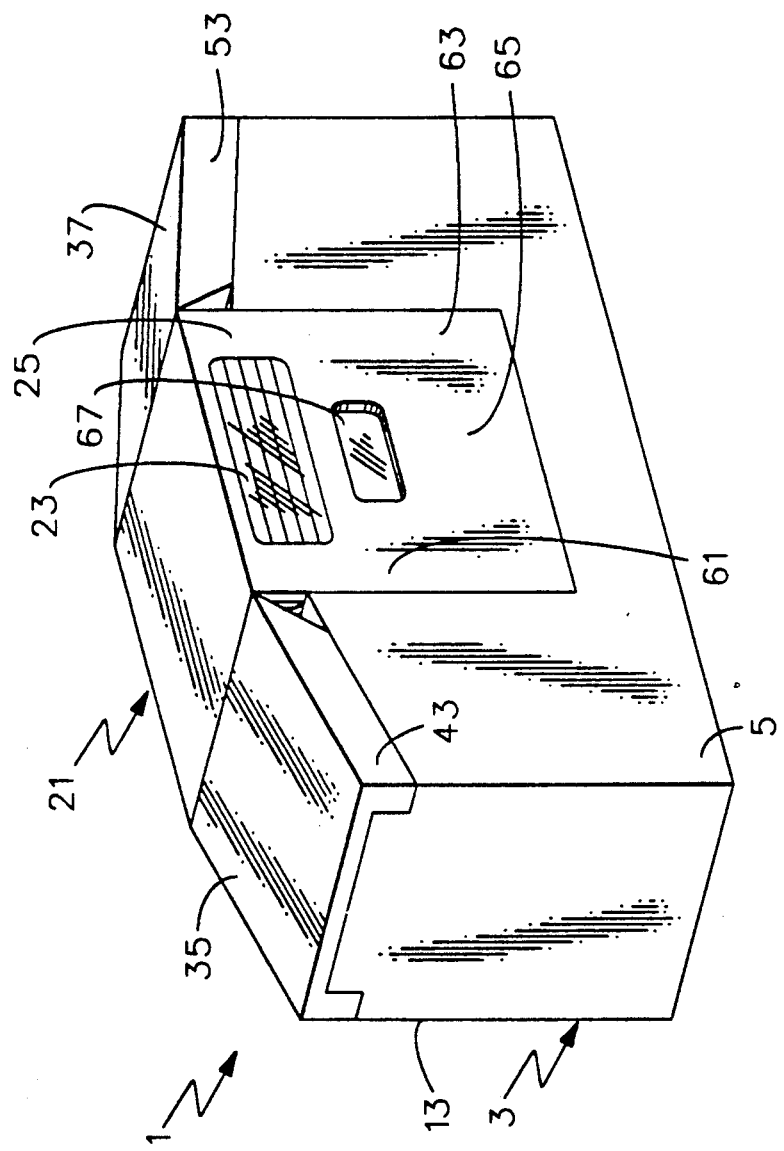
FIG. 3 is a front perspective view of the compact camera showing the flash unit deployed in a storage or non-firing position.

Referring now to the drawings, FIGS. 1-3 illustrate a compact camera 1 having a camera body or housing 3. The camera body 3 includes a front face 5 having a front cut-out 7 and a lens opening 9 holding a conventional taking lens 11, a rear face 13 having a rear cut-out (not shown) similar in shape to the front cut-out, and a pair of spaced top face portions 15 and 17 separated from each other by a gap or tunnel-like viewfinder airspace 19 that is open at its top, front and rear as can be seen in FIG. 1.

A conventional electronic flash unit 21 has a flash emission window 23 located at a front face 25 of the flash unit and a pair of sockets 27 and 29 located at opposite sides 31 and 33 of the flash unit. See FIG. 2. A pair of flash support legs 35 and 37 are configured to entirely cover the top face portions 15 and 17 of the camera body 3 when the flash unit 21 is in a storage position shown in FIG. 3. The leg 35 has one end 39 corresponding to the shape of the socket 27 which is pivotally mounted via a pin 41 in the socket to effect a pivoting-only connection between that end and the flash unit and another end 43 having an integral pin 45 which extends through a slot 47 in the camera body 3 immediately beneath its top face portion 15 to effect a pivoting-sliding connection between that end and the top face portion. See FIG. 1. The leg 37 has one end 49 corresponding to the shape of the socket 29 which is pivotally mounted via a pin 51 in the socket to effect a pivoting-only connection between that end and the flash unit and another end 53 having an integral pin 55 which extends through a slot 57 in the camera body 3 immediately beneath its top face portion 17 to effect a pivoting-sliding connection between that end and the top face portion. This arrangement enables the legs 35 and 37 to slide away from each other to be collapsed flat against the top face portions 15 and 17 and the flash unit 21 to be retracted or lowered into the gap 19 when the flash unit is moved to its storage position shown in FIG.

3, and it enables the legs to slide towards each other to be raised from the top face portions and the flash unit to be projected from the gap when the flash unit is moved to an operative or firing position shown in FIG. 1. A conventional shutter release button 59 is located on the top face portion 15 to be covered by the leg 35 when the leg is collapsed against the top face portion. See FIGS. 1 and 3.

Stabilizer means for the flash support legs 15 and 17 and the flash unit 21 is provided in the form of a sleeve 61 which depends from the flash unit. The sleeve 61 includes a front face 63 having an integral lens cover 65 for the taking lens 11 and the lens opening 9, a front viewfinder window 67, and a rear face (not shown) similar in shape to the front face and having a rear viewfinder window aligned with the front viewfinder window. As can be appreciated by looking at FIGS. 1 and 3, the front face 63 and the rear face (not shown) of the sleeve 61 reside in the front cut-out 7 and the rear cut-out (not shown) of the camera body 3 to constrain movement of the flash unit 21 between its storage and operative positions to up and down movement in FIGS. 1 and 3. When the flash unit 21 is in its storage position shown in FIG. 3, the lens cover 65 is located in covering relationship with the lens opening 9 and the taking lens 11 and the front viewfinder window 67 and the rear viewfinder window (not shown) are removed from the gap 19. Conversely, when the flash unit 21 is in its operative position shown in FIG. 1, the lens cover 65 is removed from covering relationship with the lens opening 9 and the taking lens 11 and the front viewfinder window 67 and the rear viewfinder window (not shown) are aligned with the gap 19. Locking projections (not shown) are provided on the front and rear faces 5 and 13 of the camera body 3 within the front cut-out 7 and the rear cut-out (not shown) to be received in corresponding cavities (not shown) formed in the reverse sides of the front face 63 and the rear face (not shown) of the sleeve 61 to releasably lock the flash unit 21 in its operative and storage positions shown in FIGS. 1 and 3.

The invention has been described with reference to a preferred embodiment. However, it will be appreciated that various modifications can be effected within the ordinary skill in the art without departing from the scope of the invention. For example, in place of the two slots 47 and 57 in the camera body 3 for the two pins 45 and 55, respective pairs of tracks may be provided for corresponding pairs of protuberance formed on the legs 35 and 37. Also, a helical tension spring can be connected to the pins 45 and 55 to bias the flash unit 21 from its storage position to its operative position.

I claim:

1. A compact camera comprising a camera body, a flash unit, and means supporting said flash unit for movement relative to said camera body between a storage position and an operative position, is characterized in that:

said supporting means includes a pair of flash support legs configured to be able to cover respective, spaced, top face portions of said camera body separated from each other by a gap adapted to receive said flash unit and means connecting said legs to said flash unit and to the camera body for retracting the flash unit into said gap and collapsing the legs substantially flat against said top face portions of the camera body when the flash unit is moved to its storage position and for projecting the flash unit from the gap and raising the legs from the top face portions when the flash unit is in its operative position.

2. A compact camera as recited in claim 1, wherein a shutter release button is located on one of said top face portions of said camera body to be covered by one of said flash support legs when that one leg is collapsed against that one face portion.

3. A compact camera as recited in claim 1, wherein said connecting means includes respective pivoting-only connections between said flash support legs and said flash unit and respective pivoting-sliding connections between the legs and said top face portions of said camera body.

4. A compact camera as recited in claim 3, wherein said pivoting-only connections are located at opposite sides of said flash unit.

5. A compact camera as recited in claim 4, wherein said pivoting-sliding connections are adapted to make said flash support legs slide away from each other as the legs are collapsed against said top face portions of said camera body.

* * * * *

UNITED STATES PATENT AND TRADEMARK OFFICE
CERTIFICATE OF CORRECTION

PATENT NO. : 5,255,032
DATED : 10/19/93
INVENTOR(S) : Patricia Michaud

It is certified that error appears in the above-identified patent and that said Letters Patent is hereby corrected as shown below:

Col. 1, line 8 "078/917,856" should read --07/917,856--

Signed and Sealed this

Fifth Day of July, 1994

Attest:

BRUCE LEHMAN

Attesting Officer    Commissioner of Patents and Trademarks